US011836628B2

United States Patent
Son et al.

(10) Patent No.: US 11,836,628 B2
(45) Date of Patent: Dec. 5, 2023

(54) METHOD AND APPARATUS WITH NEURAL NETWORK OPERATION PROCESSING

(71) Applicant: SAMSUNG ELECTRONICS CO., LTD., Suwon-si (KR)

(72) Inventors: Jinwoo Son, Seoul (KR); Sangil Jung, Yongin-si (KR); Changyong Son, Anyang-si (KR); Dongwook Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 412 days.

(21) Appl. No.: 17/124,791

(22) Filed: Dec. 17, 2020

(65) Prior Publication Data

US 2022/0019895 A1 Jan. 20, 2022

(30) Foreign Application Priority Data

Jul. 15, 2020 (KR) .................. 10-2020-0087449

(51) Int. Cl.
*G06N 3/082* (2023.01)
*G06N 3/10* (2006.01)

(52) U.S. Cl.
CPC .............. *G06N 3/082* (2013.01); *G06N 3/10* (2013.01)

(58) Field of Classification Search
CPC .................................. G06N 3/082; G06N 3/10
See application file for complete search history.

(56) References Cited

U.S. PATENT DOCUMENTS

| 2017/0344876 A1* | 11/2017 | Brothers | G06N 3/082 |
| 2019/0012806 A1* | 1/2019 | Lehmann | G06T 7/75 |
| 2019/0130250 A1* | 5/2019 | Park | G06F 17/15 |
| 2019/0370656 A1 | 12/2019 | Xie | |

FOREIGN PATENT DOCUMENTS

| CN | 110598731 A | 12/2019 |
| WO | WO 2019/085655 A1 | 5/2019 |
| WO | WO 2019/190340 A1 | 10/2019 |

OTHER PUBLICATIONS

Sajid Anwar, Kyuyeon Hwang, and Wonyong Sung. 2017. Structured pruning of deep convolutional neural networks. J. Emerg. Technol. Comput. Syst. 13, 3, Article 32 (Feb. 2017), 18 pages. (Year: 2017).*

Zhang, Dong-Qing. "Clcnet: Improving the efficiency of convolutional neural network using channel local convolutions." Proceedings of the IEEE Conference on Computer Vision and Pattern Recognition. 2018. (Year: 2018).*

(Continued)

*Primary Examiner* — Eric Nilsson
(74) *Attorney, Agent, or Firm* — NSIP Law

(57) ABSTRACT

A processor-implemented neural network method includes: obtaining a first weight kernel of a weight model and pruning information of the first weight kernel; determining, based on the pruning information, a processing range of an input feature map for each weight element vector of the first weight kernel; performing a convolution operation between the input feature map and the first weight kernel based on the determined processing range; and generating an output feature map of a neural network layer based on an operation result of the convolution operation.

29 Claims, 12 Drawing Sheets

(56) References Cited

OTHER PUBLICATIONS

Wang, Xiaowei et al. "Bit Prudent In-Cache Acceleration of Deep Convolutional Neural Networks" *IEEE International Symposium on High Performance Computer Architecture HPCA* 2019 (13 pages in English).
Extended European Search Report dated Sep. 3, 2021 in counterpart European Patent Application No. 21161505.9 (7 pages in English).
U.S. Appl. No. 16/255,850, filed Jan. 24, 2019, Xie.
Cheng-Hao Tu et al., "Pruning Depthwise Separable Convolutions for Extra Efficiency Gain of Lightweight Models" *ICLR 2020 Conference Withdrawn Submission*, openreview.net, Sep. 26, 2019.
Ruizhe Zhao et al., "Efficient Structured Pruning and Architecture Searching for Group Convolution", *Proceedings of the IEEE/CVF International Conference on Computer Vision (ICCV)*, arxiv.org, Oct. 28, 2019.

\* cited by examiner

Pruning information 300: | Number | Position | Number | Position | Number | Position | Number | Position |

METHOD AND APPARATUS WITH NEURAL NETWORK OPERATION PROCESSING

CROSS-REFERENCE TO RELATED APPLICATIONS

This application claims the benefit under 35 USC § 119(a) of Korean Patent Application No. 10-2020-0087449, filed on Jul. 15, 2020, in the Korean Intellectual Property Office, the entire disclosure of which is incorporated herein by reference for all purposes.

BACKGROUND

1. Field

The following description relates to a method and apparatus with neural network operation processing.

2. Description of Related Art

Technical automation of a recognition process may be implemented using, for example, a neural network model implemented by a processor as a special calculation structure, which may provide a computationally intuitive mapping between an input pattern and an output pattern after considerable training. An ability to be trained to generate such mapping may be referred to as a "training ability of a neural network." Moreover, due to specialized training, such a specialized and trained neural network may have a generalization ability to generate a relatively accurate output for an input pattern that is not trained.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented neural network method includes: obtaining a first weight kernel of a weight model and pruning information of the first weight kernel; determining, based on the pruning information, a processing range of an input feature map for each weight element vector of the first weight kernel; performing a convolution operation between the input feature map and the first weight kernel based on the determined processing range; and generating an output feature map of a neural network layer based on an operation result of the convolution operation.

The pruning information may include information of a number of weight element vectors included in the first weight kernel and information of positions of the weight element vectors in the first weight kernel, and each of the weight element vectors in the first weight kernel may correspond to a valid vector distinguished from an invalid vector removed from the first weight kernel in a pruning process.

The determining of the processing range for each weight element vector may include determining a first processing range corresponding to a first weight element vector of the first weight kernel in the input feature map based on the pruning information, and the performing of the convolution operation may include generating a first intermediate output plane by performing a convolution operation between the first weight element vector and the first processing range.

The convolution operation between the first weight element vector and the first processing range may include a 1×1 convolution operation.

The convolution operation between the first weight element vector and the first processing range may include 1×1 convolution operations between each input element vector of the first processing range and the first weight element vector.

The generating of the output feature map may include generating a first output plane of the output feature map by accumulating intermediate output planes comprising the first intermediate output plane.

The generating of the output feature map may include generating a first output plane of the output feature map by accumulating intermediate output planes corresponding to the operation result of the convolution operation.

The first weight kernel and the first output plane may correspond to a first output channel.

The weight model may include a plurality of weight kernels including the first weight kernel, and weight element vectors of the weight kernels may correspond to non-zero vectors.

Sparsity of each of weight kernels of the weight model may be increased through a training process using a respective base weight kernel and scale matrix.

The training process may include, for each of the weight kernels: inducing a sparsity to the scale matrix based on a loss function; and generating the weight kernel based on a pointwise multiplication between the base weight kernel and the sparsity-induced scale matrix.

The method may include: generating an input image using a camera; and determining the input feature map, the input feature map corresponding to the input image.

A non-transitory computer-readable storage medium may store instructions that, when executed by a processor, configure the processor to perform the method.

In another general aspect, a neural network apparatus includes: a processor configured to: obtain a first weight kernel of a weight model and pruning information of the first weight kernel; determine, based on the pruning information, a processing range of an input feature map for each weight element vector of the first weight kernel; perform a convolution operation between the input feature map and the first weight kernel based on the determined processing range; and generate an output feature map of a neural network layer based on an operation result of the convolution operation.

The pruning information may include information of a number of weight element vectors included in the first weight kernel and information of positions of the weight element vectors in the first weight kernel, and each of the weight element vectors in the first weight kernel may correspond to a valid vector distinguished from an invalid vector removed from the first weight kernel in a pruning process.

The processor may be configured to: for the determining of the processing range for each weight element vector, determine a first processing range corresponding to a first weight element vector of the first weight kernel in the input feature map based on the pruning information; and for the performing of the convolution operation, generate a first intermediate output plane by performing a convolution operation between the first weight element vector and the first processing range.

For the generating of the output feature map, the processor may be configured to generate a first output plane of the output feature map by accumulating intermediate output planes comprising the first intermediate output plane.

For the generating of the output feature map, the processor may be configured to generate a first output plane of the output feature map by accumulating intermediate output planes corresponding to the operation result of the convolution operation.

The weight model may include a plurality of weight kernels including the first weight kernel, and weight element vectors of the weight kernels may correspond to non-zero vectors.

Sparsity of each of weight kernels of the weight model may be increased through a training process using a respective base weight kernel and scale matrix.

The apparatus may be an electronic apparatus comprising a camera configured to generate an input image, the processor may be configured to determine the input feature map, and the input feature map may correspond to the input image.

The apparatus may include a memory storing instructions that, when executed by the processor, configure the processor to perform the obtaining of the first weight kernel, the determining of the processing range, the performing of the convolution, and the generating of the output feature map.

In another general aspect, an electronic apparatus includes: a camera configured to generate an input image; and a processor configured to: determine an input feature map corresponding to the input image; obtain a first weight kernel of a weight model and pruning information of the first weight kernel; determine, based on the pruning information, a processing range of the input feature map for each weight element vector of the first weight kernel; perform a convolution operation between the input feature map and the first weight kernel based on the determined processing range; and generate an output feature map of a neural network layer based on an operation result of the convolution operation.

The processor may be configured to: for the determining of the processing range for each weight element vector, determine a first processing range corresponding to a first weight element vector of the first weight kernel in the input feature map based on the pruning information; and for the performing of the convolution operation, generate a first intermediate output plane by performing a convolution operation between the first weight element vector and the first processing range.

The processor may be configured to generate a recognition result for the input image based on the output feature map.

In another general aspect, a processor-implemented neural network method includes: determining, for each valid vector of a pruned weight kernel, a processing range of an input feature map based on a position of the valid vector within the pruned weight kernel; performing, for each valid vector, a convolution operation between the valid vector and the corresponding processing range of the input feature map; and generating a channel of an output feature map of a neural network layer by accumulating results of the convolution operation performed for each valid vector.

A position of each processing range within the input feature map may correspond to the position of the corresponding valid vector within the pruned weight kernel.

The valid vectors may correspond to non-zero vectors of the pruned weight kernel.

In another general aspect, a processor-implemented neural network method includes: obtaining valid vectors of pruned weight kernels and pruning information of the valid vectors; determining, for each valid vector, a processing range of an input feature map based on the pruning information; generating, for each valid vector, an intermediate output plane by performing a convolution operation between the valid vector and the corresponding processing range; generating an output feature map by generating, for each weight kernel, an output plane of an output feature map by accumulating the intermediate output planes corresponding to the weight kernel.

Other features and aspects will be apparent from the following detailed description, the drawings, and the claims.

BRIEF DESCRIPTION OF THE DRAWINGS

FIG. 4 illustrates an example of a data structure of pruning information.

Figure 1:
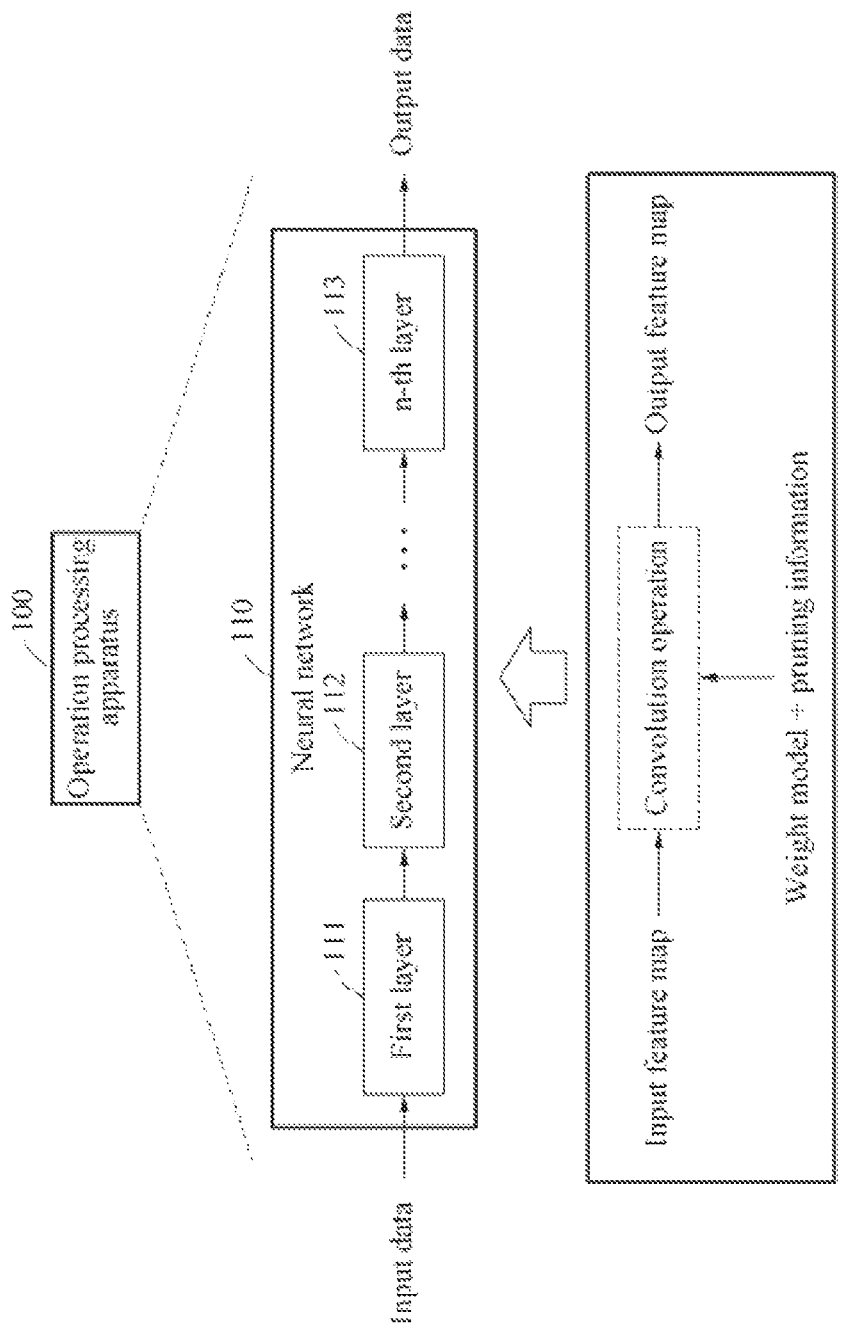
FIG. 1 illustrates an example of an operation of an operation processing apparatus associated with a convolution operation.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Hereinafter, some example embodiments will be described in detail with reference to the accompanying drawings. Various modifications may be made to the example embodiments. Here, the example embodiments are not construed as limited to the disclosure and should be understood to include all changes, equivalents, and replacements within the idea and the technical scope of the disclosure.

The terminology used herein is for the purpose of describing example embodiments only and is not intended to be limiting of the present disclosure. As used herein, the singular forms (for example, "a", "an", and "the") are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or combinations thereof, but do not preclude the presence or addition of one or more other features, integers, steps, operations, elements, components, numbers, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined herein, all terms used herein including technical or scientific terms have the same meanings as those generally understood by one of ordinary skill in the art to which this disclosure pertains consistent with and after an understanding of the present disclosure. Terms, such as those defined in commonly used dictionaries, should be construed to have meanings matching contextual meanings in the relevant art and the present disclosure, and are not to be construed as an ideal or excessively formal meaning unless otherwise defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Also, the terms "first," "second," "A," "B," "(a)," "(b)," and the like may be used herein to describe components according to example embodiments. Each of these terminologies is not used to define an essence, order or sequence of a corresponding component but used merely to distinguish the corresponding component from other component(s). Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

A component having a common function with a component included in one example embodiment is described using a like name in another example embodiment. Unless otherwise described, description made in one example embodiment may be applicable to another example embodiment and detailed description within a redundant range is omitted.

FIG. 1 illustrates an example of an operation of an operation processing apparatus (for example, an operation processing apparatus 100) associated with a convolution operation. Referring to FIG. 1, the operation processing apparatus 100 may process an operation associated with a neural network 110. In response to the operation associated with the neural network 110 being processed, the neural network 110 may perform an operation for training of the neural network 110. For example, the operation of the neural network 110 may include object classification, object detection, object identification, object recognition, or user authentication. At least a portion of processing operations associated with the neural network 110 may be embodied by hardware including a neural processor, or a combination hardware and software. The operation processing apparatus 100 may be or be provided in, for example, a mobile phone, a desktop, a laptop, a tablet personal computer (PC), a wearable device, a smart television (TV), a smart vehicle, a security system, a smart home system, a smart home appliance, and the like.

The neural network 110 may correspond to a deep neural network (DNN) including a plurality of layers. The plurality of layers may include an input layer, at least one hidden layer, and an output layer. A first layer 111, a second layer 112 and an n-th layer 113 of FIG. 1 may be at least a portion of the plurality of layers. For example, the input layer may be the first layer 111, the at least one hidden layer may include the second layer 112 through n−1 layers, and the output layer may be the n-th layer. The neural network 110 may include any one or any combination of a fully connected network (FCN), a convolutional neural network (CNN), and a recurrent neural network (RNN). For example, at least a portion of the plurality of layers in the neural network 110 may correspond to a CNN, and another portion may correspond to an FCN. In this example, the CNN may be referred to as a convolutional layer, and the FCN may be referred to as a fully connected layer.

In the CNN, data input to each layer may be referred to as an "input feature map" and data output from each layer may be referred to as an "output feature map". The input feature map and the output feature map may also be referred to as activation data. An output feature map of a layer may be, or may be used to generate, an input feature map of a subsequent layer. When a convolutional layer corresponds to an input layer, an input feature map of the input layer may correspond to input data. For example, the input data may be an input image or data resulting from an initial processing of the input image.

The neural network 110 may be trained based on deep learning, and may perform inference suitable for the purpose of training, by mapping input data and output data that are in a nonlinear relationship. The deep learning may be a machine learning scheme for solving an issue such as image or voice recognition from a big data set. The deep learning may be understood as a process of solving an optimization issue to find a point at which energy is minimized while training the neural network 110 based on prepared training data.

Through supervised or unsupervised learning of the deep learning, a structure of the neural network 110 or a weight corresponding to a model may be obtained or determined, and input data and output data may be mapped to each other through the weight. For example, when a width and a depth of the neural network 110 are sufficiently large, the neural network 110 may have a capacity large enough to implement an arbitrary function. When the neural network 110 is trained on a sufficiently large quantity of training data through an appropriate training process, an optimal performance may be achieved.

In the following description, the neural network 110 may be expressed as being "pre-trained", where "pre-" may indicate a state before the neural network 110 is "started". The "started" neural network 110 may indicate that the neural network 110 may be ready for inference. For example, "start" of the neural network 110 may include loading of the neural network 110 in a memory, or an input of input data for inference to the neural network 110 after the neural network 110 is loaded in the memory.

The operation processing apparatus 100 may perform a convolution operation between an input feature map of each convolutional layer and a weight kernel to process an operation associated with each convolutional layer, and may generate an output feature map based on an operation result of the convolution operation. To process an operation associated with the neural network 110, a plurality of operations including a multiplication and accumulation (MAC) operation may be processed. Also, a large amount of computing resources and time may be consumed to process an operation. The operation processing apparatus 100 of one or more embodiments may lighten the neural network 110 and perform high-speed operation processing, thereby reducing the above consumption of the computing resources and the time so that the neural network 110 may also be effectively implemented in a resource-limited environment, such as a sensor environment or an embedded environment (for example, a mobile terminal).

In an example, the operation processing apparatus 100 may perform a convolution operation associated with a convolutional layer in the neural network 110 based on a weight model and pruning information. In this example, pointwise pruning may be applied to the weight model. Pruning may be a scheme of lightening a model by removing redundant weight values (for example, zero values or by setting redundant weights to zero values), and may include structured pruning and unstructured pruning. The structured pruning may be a scheme of using a structural element (for example, a channel) as a unit of pruning, and the unstructured pruning may be a scheme of pruning redundant values instead of using the structural element.

For example, based on channel pruning that is a kind of structured pruning, a model may be pruned with a value of "0" for each weight kernel corresponding to an output channel. For example, in channel pruning, each of weight kernels of a same channel, determined to be redundant, may be pruned. Based on the structured pruning, acceleration and lightening may be relatively easily achieved, however, a performance may be reduced due to a removal of a significant weight (for example, by pruning of entire weight kernels which may some significant weights). Based on the unstructured pruning, a proportion of "0" may increase, but it may be difficult to achieve acceleration and lightening without hardware assistance due to a lack of regularity. Pointwise pruning may have a characteristic of the structured pruning, but may minimize a reduction in performance by using a relatively small unit, for example, a point tensor, as a unit of pruning.

Figure 2:
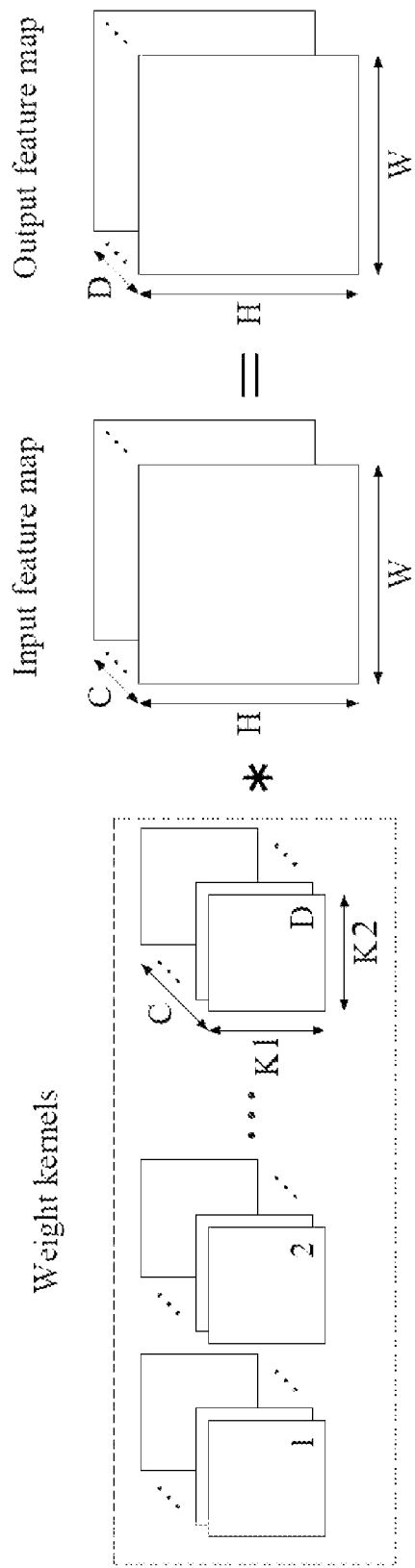
FIG. 2 illustrates an example of data related to a convolution operation.

FIG. 2 illustrates an example of data related to a convolution operation. Referring to FIG. 2, the weight model may include a kernel including D weight kernels respectively corresponding to output channels. For example, weight kernels may one-to-one correspond to output channels. For example, a number of weight kernels may equal a number of output channels. Each of the weight kernels may include a plurality of weight element vectors. For example, a size of a weight kernel may be defined as "K1×K2×C" based on width×height×input channels. The size of the weight kernel may indicate a number of weight elements included in the weight kernel. In other words, the weight kernel may include "K1×K2×C" weight elements. Here, C may indicate a number of input channels. The weight kernel may include "K1×K2" weight element vectors. When K1=K2=K, the weight kernel may include "K^2×C" weight elements, and "K^2" weight element vectors. A weight element vector may correspond to a point tensor. A size of a weight element vector may be defined as "1×1×C", for example.

The pruning information may indicate a structural feature of the weight model based on pruning. The pointwise pruning may correspond to structured pruning, and accordingly data of the weight model may have a structural meaning, and the structural meaning of the data of the weight model may be recorded in the pruning information. For example, the pruning information may include information about a position of a weight element vector included in each weight kernel and/or information about a number (for example, a total number) of weight element vectors included in each weight kernel. In this example, a weight element vector included in each weight kernel may correspond to a valid vector. The operation processing apparatus 100 may analyze a structural feature of each weight kernel of the weight model based on the pruning information, and may perform a convolution operation based on the structural feature.

The valid vector may be a weight element vector remaining in, or as a result of, a pruning process, and an invalid vector may be a weight element vector removed in the pruning process. For example, the valid vector may correspond to a non-zero vector, and the invalid vector may be a zero vector. For example, a first weight kernel of the weight model may include a third weight element vector, a sixth weight element vector, and a seventh weight element vector as valid vectors among a first weight element vector through a ninth weight element vector. In this example, the pruning information may include information about a number (for example, a total number) of valid vectors (for example, three) and information about positions of the valid vectors (for example, "3, 6 and 7" respectively corresponding to matrix positions [1,3], [2,3], [3,1]).

In an example, the operation processing apparatus 100 may perform an accumulation type convolution operation. The accumulation type convolution operation may be performed by accumulating intermediate results of a convolution operation. For example, a first intermediate output plane may be generated through a convolution operation between a first valid vector of the first weight kernel and a first processing range of the input feature map. Through the above process, intermediate output planes may be generated through a convolution operation between each valid vector of the first weight kernel and a corresponding processing range of the input feature map. The generated intermediate output planes may be accumulated to generate a first output plane, of an output feature map, corresponding to the first weight kernel. A corresponding processing range of the input feature map may be determined based on position information (for example, offset) of a valid vector. Also, the first weight kernel and the first output plane may correspond to a first output channel of the output feature map.

Based on the above accumulation type convolution operation, the operation processing apparatus 100 of one or more embodiments may perform the convolution operation to generate the output feature map without needing to perform a buffering operation of transforming the weight kernel or the input feature map into a form suitable for convolution and storing the weight kernel or the input feature map in a buffer, as performed by a typical operation processing apparatus in performing a convolution operation. Thus, a speed of the convolution operation of the operation processing apparatus 100 of one or more embodiments is faster than a speed of the convolution operation of the typical operation processing apparatus. Also, the accumulation type convolution operation of the operation processing apparatus 100 of one or more embodiments may be performed based on each valid vector, and thus pruning may be applied for each point tensor. In addition, the accumulation type convolution operation of the operation processing apparatus 100 of one or more embodiments may be suitable for pointwise pruning for skipping zeros for each point tensor.

Figure 3:
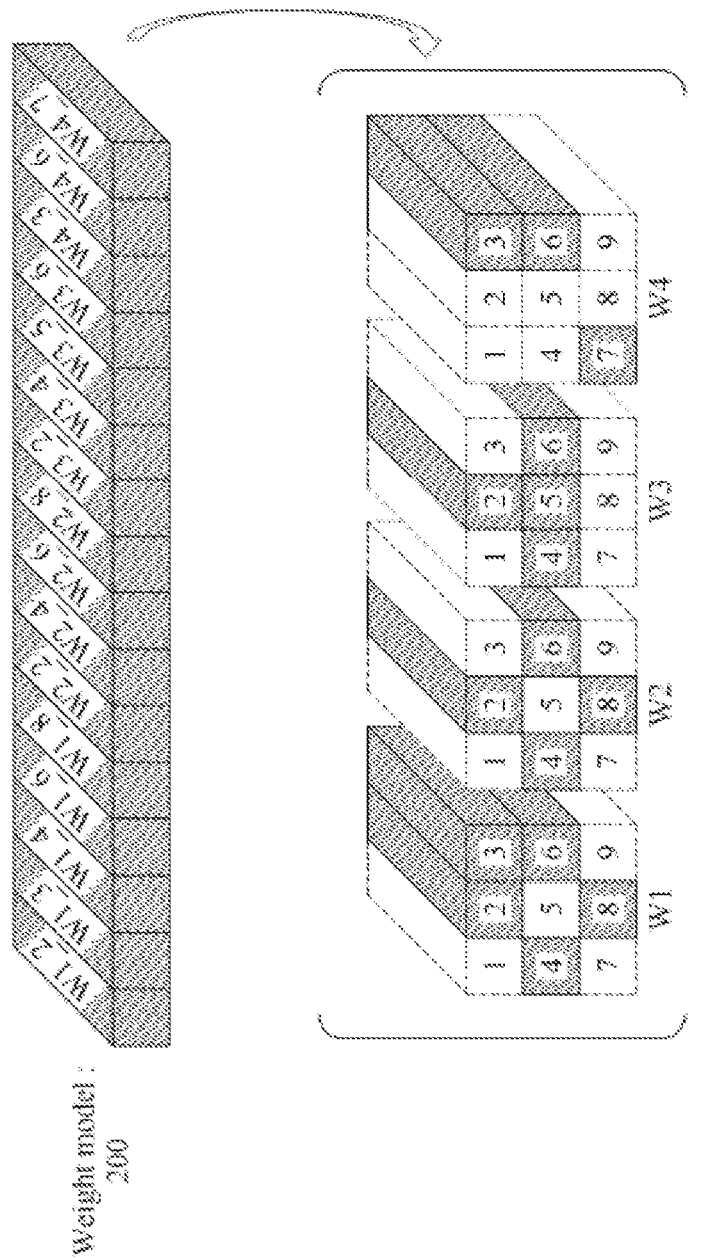
FIG. 3 illustrates an example of a data structure of a weight model.

FIG. 3 illustrates an example of a data structure of a weight model (for example, a weight model 200). Referring to FIG. 3, the weight model 200 includes weight element vectors W1_2, W1_3, W1_4, W1_6, W1_8, W2_2, W2_4, W2_6, W2_8, W3_2, W3_4, W3_5, W3_6, W4_3, W4_6, and W4_7 (referred to as "weight element vectors W1_2 through W4_7"). The weight element vectors W1_2 through W4_7 may respectively correspond to valid vectors. A weight element vector Wa_b may indicate a b-th weight element vector of an a-th weight kernel. In other words, a may be identification information of a weight kernel, and b may be position information (for example, offset) of a weight element vector. The weight model 200 may be visually represented as a three-dimensional (3D) block shown in a lower portion of FIG. 3. FIG. 3 illustrates a "3×3×C" weight kernel, that is, weight kernels satisfying "K1=K2=3". An example of the "3×3×C" weight kernel will be described below, however, this is merely an example for convenience of description. For example, K1 and K2 may have any values other than "3".

The weight model 200 may include the weight element vectors W1_2 through W4_7 corresponding to valid vectors among weight element vectors W1_1 through W4_9 of weight kernels W1 through W4. For example, when pointwise pruning is applied to the weight kernel W1 in a training operation, weight element vectors W1_2, W1_3, W1_4, W1_6, and W1_8 may be determined as valid vectors, and weight element vectors W1_1, W1_5, W1_7, and W1_9 may be determined as invalid vectors. Similarly, based on the pointwise pruning, each of weight element vectors of weight kernels W2 through W4 may be determined as either a valid vector or an invalid vector. When the weight model 200 merely includes each valid vector as continuous data, structural information associated with each valid vector may be used to interpret each valid vector. The above structural information may be provided through pruning information.

FIG. 4 illustrates an example of a data structure of pruning information (for example, pruning information 300). Referring to FIG. 4, the pruning information 300 may include information associated with valid vectors of weight kernels W1 through W4 (for example, the weight element vectors W1_2 through W4_7 of FIG. 3). For example, the pruning information 300 may include information about a number of valid vectors included in each of the weight kernels W1 through W4 and information about a position of each of the valid vectors in each of the weight kernels W1 through W4.

In an example, referring to FIGS. 3 and 4, the pruning information 300 may include "5" indicating a number of valid vectors included in the weight kernel W1, and "2, 3, 4, 6, 8" indicating positions of the valid vectors in the weight kernel W1; may include "4" indicating a number of valid vectors included in the weight kernel W2 and "2, 4, 6, 8" indicating positions of the valid vectors in the weight kernel W2; may include "4" indicating a number of valid vectors included in the weight kernel W3 and "2, 4, 5, 6" indicating positions of the valid vectors in the weight kernel W3; and may include "3" indicating a number of valid vectors included in the weight kernel W4 and "3, 6, 7" indicating positions of the valid vectors in the weight kernel W4.

The pruning information 300 may be provided as header information of a weight model. In an example, in the pruning information 300, 2 bytes may be assigned to each of the weight kernels W1 through W4. In this example, the pruning information 300 may include "0000101011101010" for the weight kernel W1. Here, "0000101" may indicate a number of valid vectors and "011101010" may indicate a position of each valid vector.

For example, a binary number "0000101" may represent a decimal number "5". Each bit position of "011101010" may correspond to each position of the "3×3×C" weight kernel, "1" may indicate a valid vector and "0" may indicate an invalid vector. In other words, "011101010" may indicate that second, third, fourth, sixth and eighth weight element vectors correspond to valid vectors. Similarly, the pruning information 300 may include "0000100010101010" for the weight kernel W2, "0000100010111000" for the weight kernel W3, and "0000011001001100" for the weight kernel W4. In an example, when a bit order corresponds to an order of a width direction and a height direction of a weight kernel, position information of the valid vectors in the weight kernel W1 may be displayed as "011101010" as described above. In another example, when the bit order corresponds to an order of the height direction and the width direction of the weight kernel, the position information of the valid vectors in the weight kernel W1 may be displayed as "010101110" (i.e., in a reverse order).

Figure 5:
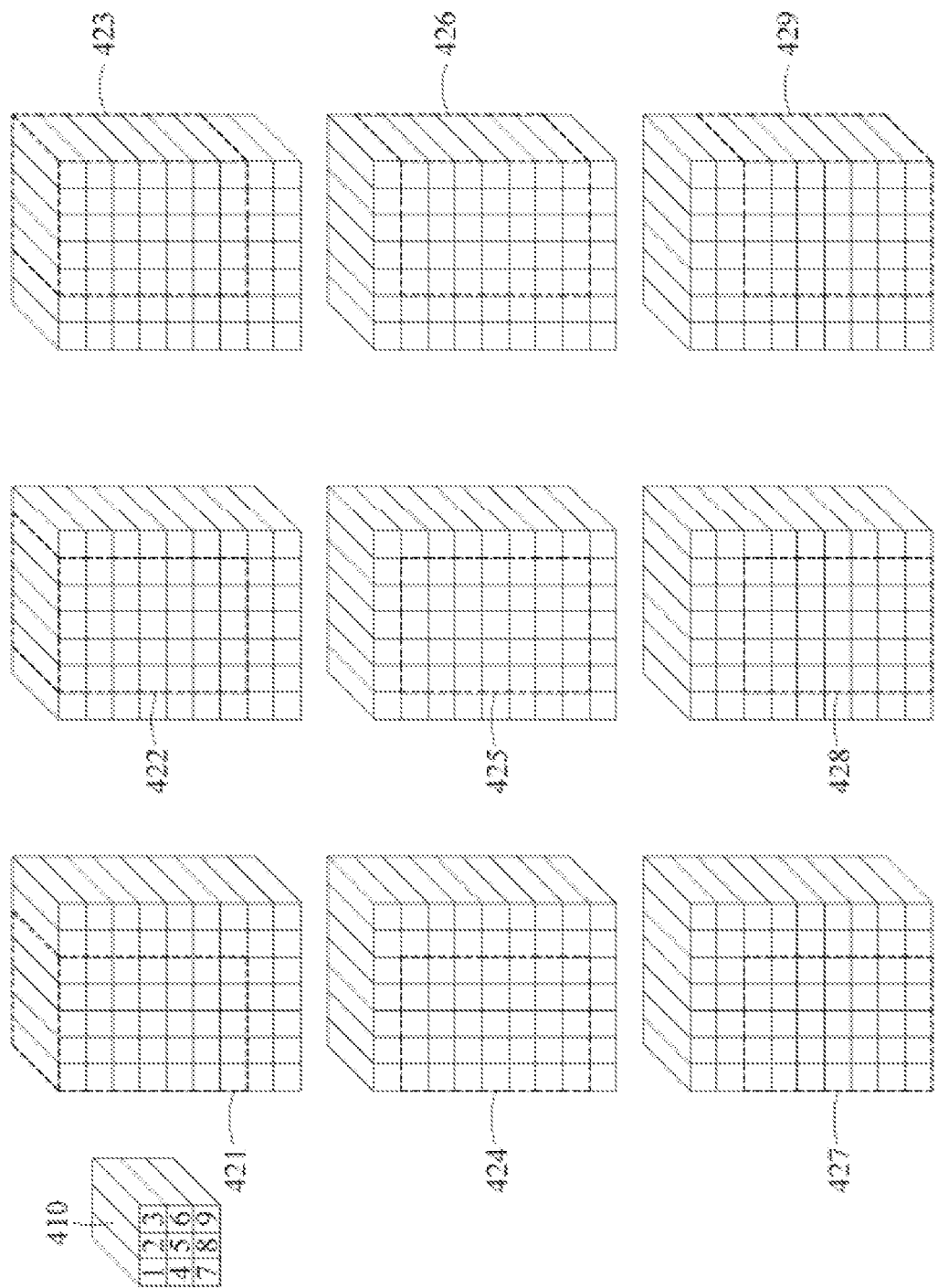
FIG. 5 illustrates an example of a processing range corresponding to each weight element vector.

FIG. 5 illustrates an example of a processing range corresponding to each weight element vector. As described above, according to examples, an accumulation type convolution operation of one or more embodiments may be performed. For the accumulation type convolution operation, a processing range of an input feature map corresponding to each valid vector may be determined. For example, when a convolution operation between a weight kernel and an input feature map is performed based on a sliding window scheme, a path through which the weight kernel slides may be specified in the input feature map. Accordingly, a region through which each weight element vector of the weight kernel passes may be specified in the input feature map. According to examples, a processing range of the input feature map corresponding to a weight element vector may correspond to a region of the input feature map through which the weight element vector passes.

For example, referring to FIG. 5, a first processing range 421 of an input feature map may correspond to a first weight element vector of a weight kernel 410. Similarly, a second processing range 422 of the input feature map may correspond to a second weight element vector of the weight kernel 410, and a third processing range 423 of the input feature map may correspond to a third weight element vector of the weight kernel 410. A fourth processing range 424 through a ninth processing range 429 of the input feature map may one-to-one respectively correspond to a fourth weight element vector through a ninth weight element vector of the weight kernel 410. The processing ranges defined above may be used in an accumulation type convolution operation of one or more embodiments that will be further described below.

Figure 6:
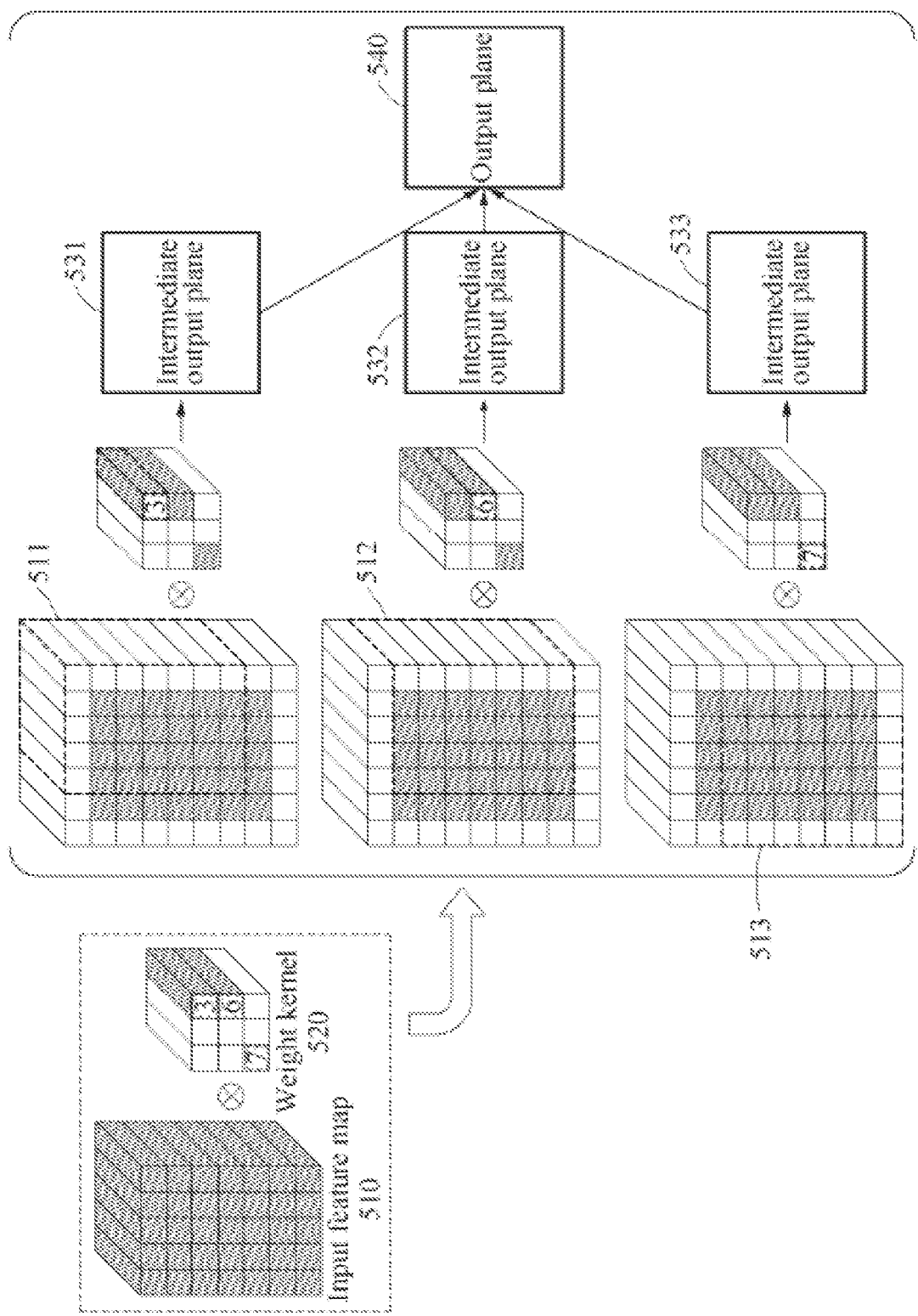
FIG. 6 illustrates an example of a process of generating an output plane through an accumulation type convolution operation.

FIG. 6 illustrates an example of a process of generating an output plane through an accumulation type convolution operation. Referring to FIG. 6, an accumulation type convolution operation between an input feature map 510 and a weight kernel 520 may be performed. A convolution operation between the input feature map 510 and the weight kernel 520 may include an individual convolution operation between the input feature map 510 and each valid vector of the weight kernel 520.

Although the weight kernel 520 is shown as a whole in FIG. 6 to assist understanding, the convolution operation may be performed with respect to a valid vector of the weight kernel 520, not the whole weight kernel 520. In other words, although the weight kernel 520 is shown in a form of "3×3", the weight kernel 520 may act as if three 1×1 weight kernels are used. In the weight kernel 520, a third weight element vector, a sixth weight element vector, and a seventh weight element vector may correspond to valid vectors. Thus, a convolution operation for the weight kernel 520 may be performed based on the third weight element vector, the sixth weight element vector, and the seventh weight element vector.

For example, an intermediate output plane 531 may be generated as an operation result of a convolution operation between a processing range 511 of the input feature map 510 and the third weight element vector of the weight kernel 520. Similarly, an intermediate output plane 532 may be generated as an operation result of a convolution operation between a processing range 512 of the input feature map 510 and the sixth weight element vector of the weight kernel 520, and an intermediate output plane 533 may be generated as an operation result of a convolution operation between a processing range 513 of the input feature map 510 and the seventh weight element vector of the weight kernel 520. In an example, the input feature map 510 may be zero padded such that each of the processing ranges 511, 512, and 513 include a portion of the zero padding.

Each processing range of the input feature map 510 may be specified or determined based on pruning information associated with the weight kernel 520. For example, an operation processing apparatus (for example, the operation processing apparatus 100) may analyze or determine, in advance of the convolution operations, a correspondence relationship between each weight element vector of a weight kernel and each processing range of an input feature map (as shown in FIG. 5, for example), and may specify a processing range corresponding to a valid vector of the weight kernel 520 in the input feature map 510 based on the correspondence relationship.

A convolution operation between each weight element vector and each processing range may include a 1×1 convolution operation. For example, the convolution operation between the third weight element vector and the processing range 511 may include a 1×1 convolution operation between an input element vector of the processing range 511 and the third weight element vector, such that an operation result of the 1×1 convolution operation may correspond to one output element of the intermediate output plane 531. 1×1 convolution operations may be performed between each input element vector of the processing range 511 and the third weight element vector, to determine all output elements of the intermediate output plane 531. Accordingly, in an example, a width and height of the intermediate output planes 531, 532, and 533 may be equal to a width and height of the respective processing ranges 511, 512, and 513.

The intermediate output planes 531, 532 and 533 may be accumulated to generate an output plane 540 of an output feature map. The weight kernel 520 and the output plane 540 may correspond to an output channel. The weight kernel 520 may correspond to one of a plurality of weight kernels included in a weight model, and each of the plurality of weight kernels may correspond to an output channel. An output plane corresponding to each output channel may be generated based on an accumulation type convolution operation of each weight kernel. When all output planes corresponding to all output channels are generated, the output feature map may be completely generated.

Figure 7:
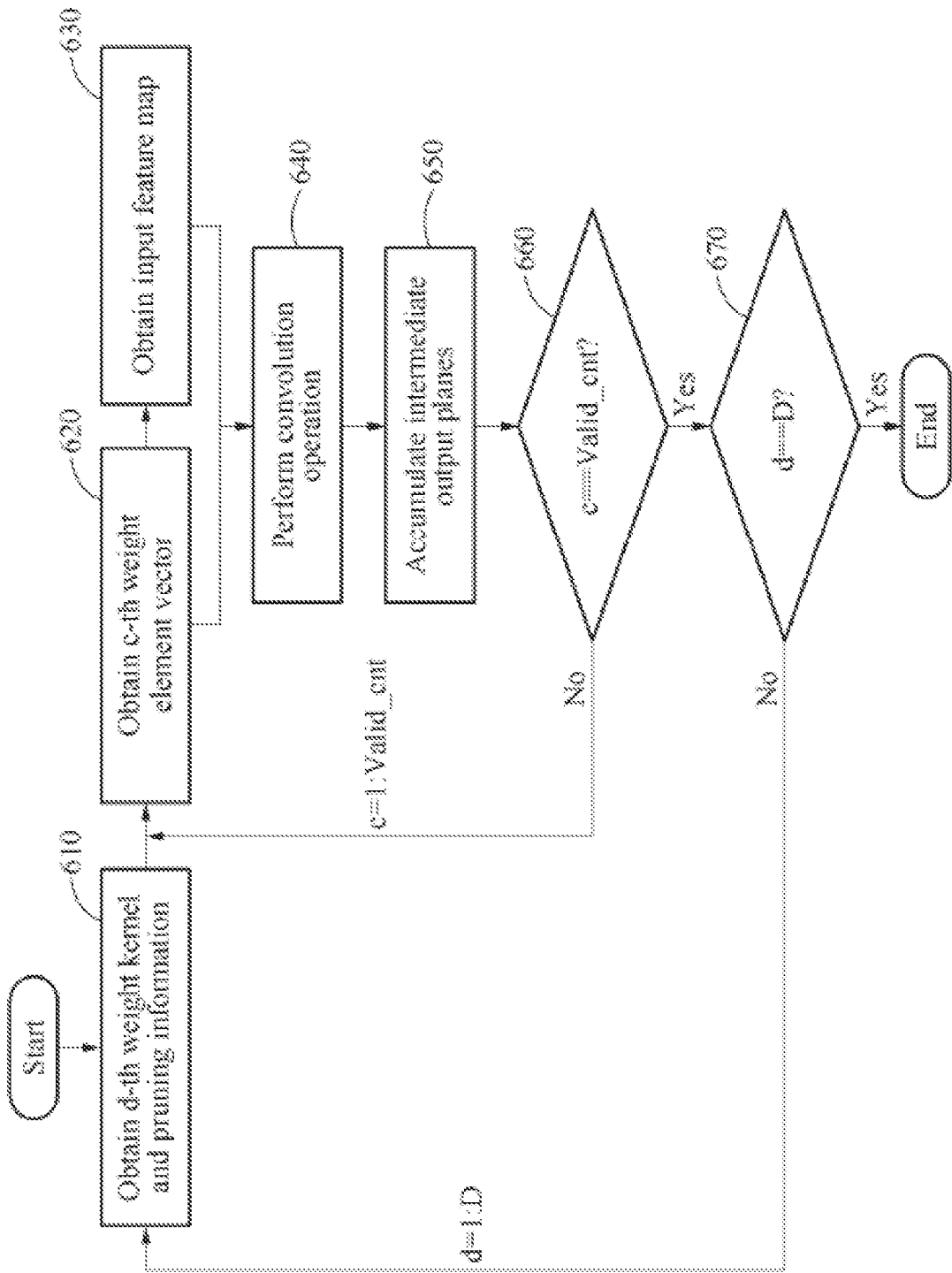
FIG. 7 illustrates an example of a process of generating an output feature map through a convolution operation.

FIG. 7 illustrates an example of a process of generating an output feature map through a convolution operation. FIG. 7 illustrates an operation associated with an n-th layer (for example, a convolutional layer) of a neural network. Referring to FIG. 7, in operation 610, an operation processing apparatus (for example, the operation processing apparatus 100) may obtain a d-th weight kernel and may obtain or determine pruning information. A total number of weight kernels for the n-th layer may be "D". The operation processing apparatus may obtain or determine information (for example, a number of valid vectors and/or a position of a valid vector) associated with a valid vector of the d-th weight kernel by parsing the pruning information.

In operation 620, the operation processing apparatus may obtain or determine a c-th weight element vector. The obtained weight element vector may correspond to a valid vector. In operation 630, the operation processing apparatus may obtain or determine an input feature map of an n-th layer. In operation 640, the operation processing apparatus may perform a convolution operation. The operation processing apparatus may specify or determine a processing range corresponding to a weight element vector in the input feature map, and may perform a 1×1 convolution operation between the weight element vector and each of input feature vectors of the processing range. Based on the convolution operation of operation 640, a c-th intermediate output plane may be generated. In operation 650, the operation processing apparatus may accumulate intermediate output planes.

In operation 660, the operation processing apparatus compares c to Valid-cnt. Valid-cnt may indicate a total number of valid vectors in the d-th weight kernel. In an example, when c and Valid-cnt are different, that is, when an operation of one of the valid vectors in the d-th weight kernel has not yet been completed, c may be increased by "1" and operation 620 may be performed. In another example, when c and Valid-cnt are the same, that is, when operations associated with all the valid vectors in the d-th weight kernel are completed, operation 670 may be performed. c and Valid-cnt being the same may indicate that all intermediate output planes for the d-th weight kernel have been accumulated, such that an output plane for the d-th weight kernel has been generated.

In operation 670, the operation processing apparatus compares "d" and "D". In an example, when "d" and "D" are different, that is, when an operation of one of the "D" weight kernels of the n-th layer has not yet been completed, "d" may be increased by "1" and operation 610 may be performed. In another example, when "d" and "D" are the same, that is, when operations associated with all the "D" weight kernels of the n-th layer are completed, a convolution operation associated with the n-th layer may be terminated. "d" and "D" being the same may indicate that all output planes for the "D" weight kernels, that is, "D" output channels are generated such that an output feature map of the n-th layer has been generated. The above process of FIG. 7 may be repeated with respect to each layer of the neural network, wherein an output feature map of a layer may be, or may be used to generate, an input feature map of a subsequent layer, wherein an output feature map of a final layer may be, or may be used to generate, output data of the neural network. The output data may correspond to a result of object classification, object detection, object identification, object recognition, or user authentication, as non-limiting examples.

Figure 8:
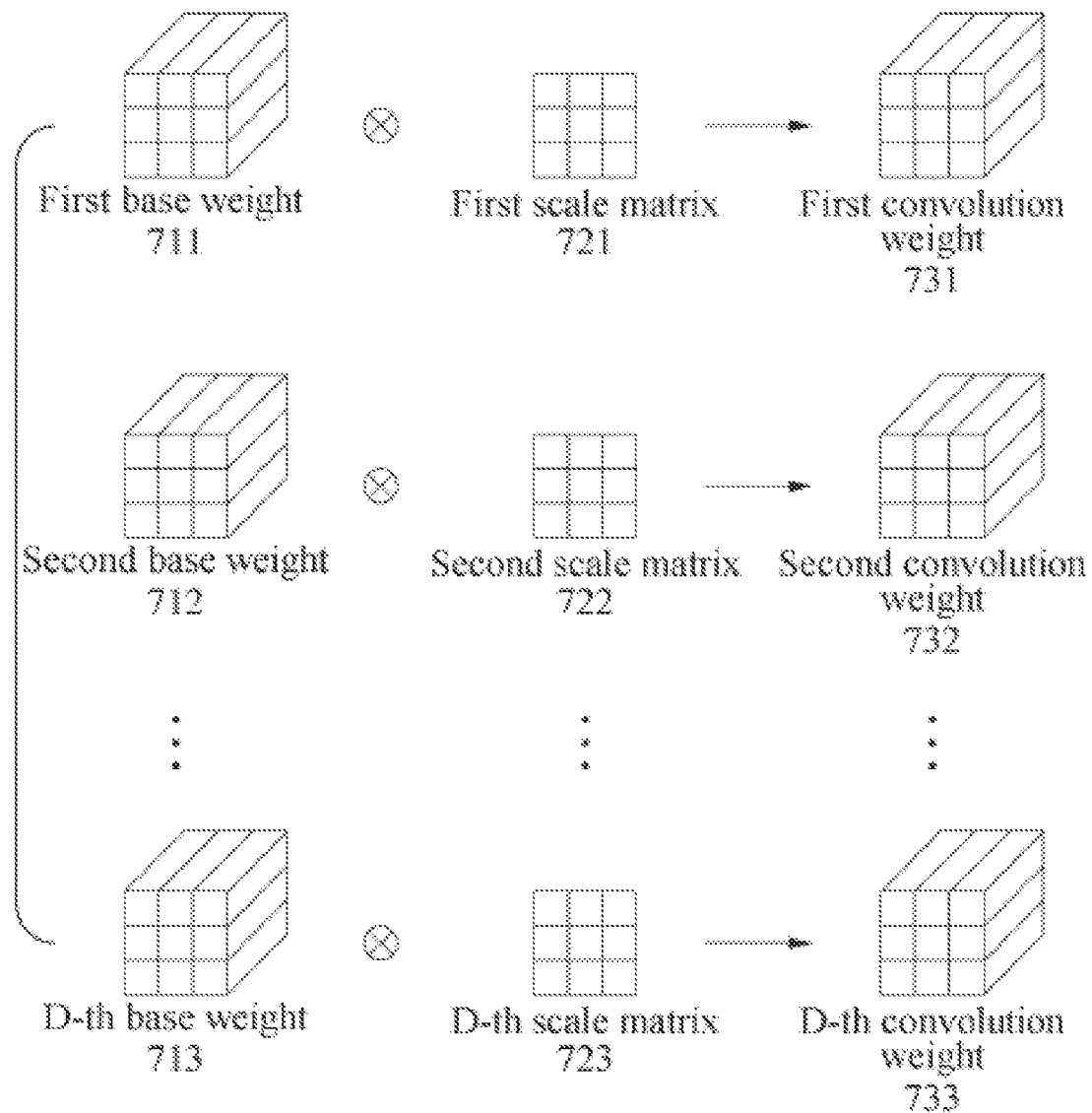
FIG. 8 illustrates an example of a training process of a neural network using a scale matrix.

FIG. 8 illustrates an example of a training process of a neural network using a scale matrix. The neural network may include a convolutional layer. A training output may be determined based on a convolution operation between a training input for the convolutional layer and a convolution weight kernel. The neural network may be trained based on a loss of the training output.

The convolution weight kernel may be determined based on a base weight kernel and a scale matrix. Hereinafter, the convolution weight kernel and the base weight kernel may be referred to as a "convolution weight" and a "base weight", respectively. The base weight may have a size of "K1×K2×C" and the scale matrix may have a size of "K1×K2". As a non-limiting example, as shown in FIG. 8, K1=K2=3. In an example, the convolution weight may be determined based on a pointwise multiplication operation between the base weight and the scale matrix.

A first convolution weight 731 through a D-th convolution weight 733 of FIG. 8 may correspond to weight kernels for a predetermined convolutional layer. As described above, the first convolution weight 731 may be determined based on a pointwise multiplication operation between a first base weight 711 and a first scale matrix 721, a second convolution weight 732 may be determined based on a pointwise multiplication operation between a second base weight 712 and a second scale matrix 722, and the D-th convolution weight 733 may be determined based on a pointwise multiplication operation between a D-th base weight 713 and a D-th scale matrix 723.

The neural network may be trained to minimize a loss of the training output of the convolutional layer. For example, the training output may be determined based on a convolution operation between the training input and the convolution weight, and a difference between the training output and a label may be determined as a loss. The convolution weight may be adjusted to reduce the loss. By repeating the above process, a convolution weight to minimize a loss may be determined.

A loss function may include a task loss component (for example, cross entropy) and a sparsity-inducing penalty component. Due to the sparsity-inducing penalty component of the loss function, sparsity may be induced to the convolution weight. For example, the loss function may be defined as shown in Equation 1 below.

$$L = \sum_{(x,y)} l(f(x, W*r), y) + \gamma \sum_{r \in \tau} g(r) \qquad \text{Equation 1}$$

In Equation 1, L denotes a loss function, x denotes a training input (for example, a training image), W denotes a base weight, r denotes a scale matrix, and f denotes a convolution operation. Accordingly, W*r denotes a convolution weight, and f(x, W*r) denotes a convolution operation between a training input and a convolution weight. Also, y denotes a label, and l denotes a loss. Thus, l(f(x, W*r), y) denotes a loss between a label and an operation result of a convolution operation. Also, γ denotes a scale hyperparameter, and g denotes a sparsity-inducing penalty (for example, L1-norm).

Figure 9:
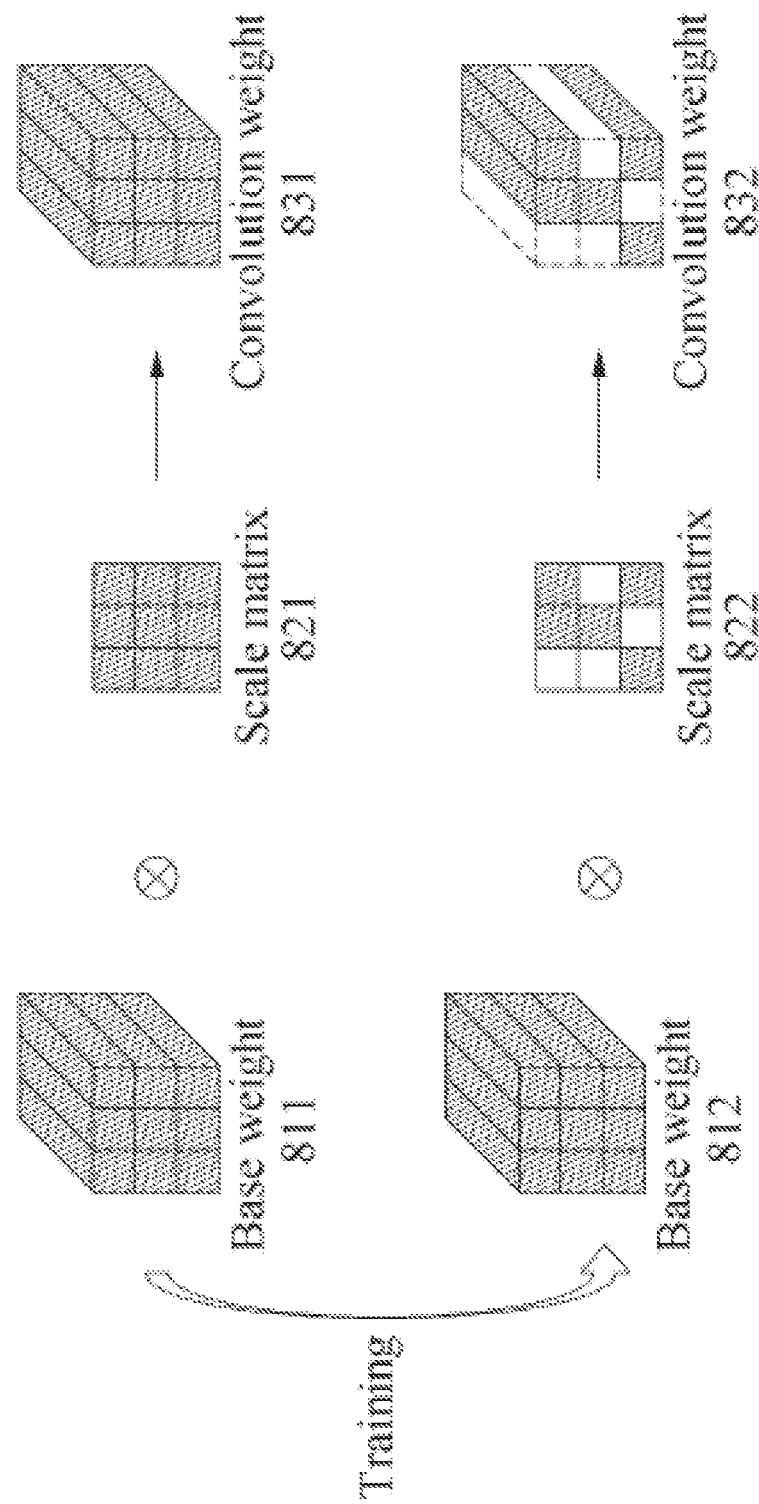
FIG. 9 illustrates an example of a change in a convolution weight based on training.

FIG. 9 illustrates an example of a change in a convolution weight based on training. Referring to FIG. 9, sparsity of a convolution weight 831 may increase through a training process using a base weight 811 and a scale matrix 821. For example, due to a sparsity-inducing penalty component of a loss function, sparsity may be induced to the scale matrix 821, and accordingly the scale matrix 821 may be changed to, or trained to be, a scale matrix 822 with sparsity. Also, a change of the scale matrix 821 to the scale matrix 822 may lead to a difference between the base weight 811 and a base weight 812.

The convolution weight 831 may be determined based on a pointwise multiplication operation between the base weight 811 and the scale matrix 821, and a convolution weight 832 may be determined based on a pointwise multiplication operation between the base weight 812 and the scale matrix 822. Due to an influence of sparsity of the scale matrix 822, the convolution weight 832 may also have sparsity (for example, a same sparsity). Pruning may be applied to the convolution weight 832 for each point tensor, and thus the above pruning may be referred to as "pointwise pruning".

A weight model (for example, the weight model 200) may be determined based on the convolution weight 832. Also, pruning information may be determined based on a distribution of valid vectors in the convolution weight 832. For example, pointwise pruning may be applied to the first convolution weight 731 through the D-th convolution weight 733 of FIG. 8, to construct the weight model. Also, pruning information (for example, the pruning information 300) for the weight model may be generated. For example, the pruning information may be stored as a header of the weight model.

Figure 10:
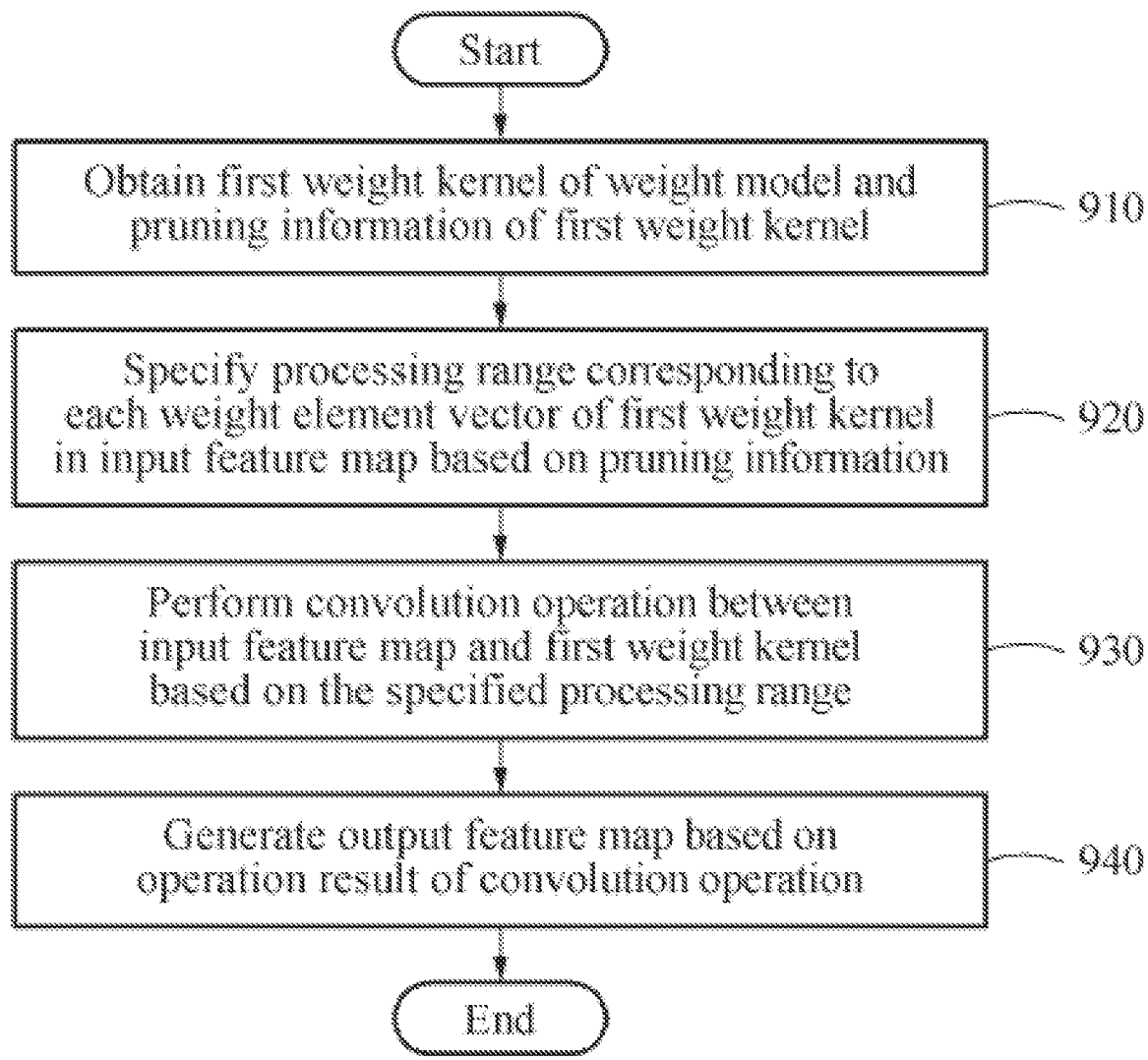
FIG. 10 illustrates an example of an operation processing method associated with a convolution operation.

FIG. 10 illustrates an example of an operation processing method associated with a convolution operation. Referring to FIG. 10, in operation 910, an operation processing apparatus (for example, the operation processing apparatus 100) may obtain or determine a first weight kernel of a weight model and pruning information of the first weight kernel. In operation 920, the operation processing apparatus may specify or determine a processing range corresponding to each weight element vector of the first weight kernel in an input feature map based on the pruning information. In operation 930, the operation processing apparatus may perform a convolution operation between the input feature map and the first weight kernel based on the specified processing range. For example, the operation processing apparatus may specify a first processing range corresponding to a first weight element vector of the first weight kernel in the input feature map based on the pruning information, and may perform a convolution operation between the first weight element vector and the first processing range, to generate a first intermediate output plane. In operation 940, the operation processing apparatus may generate an output feature map based on an operation result of the convolution operation. For example, the operation processing apparatus may generate a first output plane of the output feature map by accumulating intermediate output planes including the first intermediate output plane. The description and operations of FIGS. 1 through 9, 11 and 12 as described above may be applicable to the operation processing method, and further description is not repeated herein.

Figure 11:
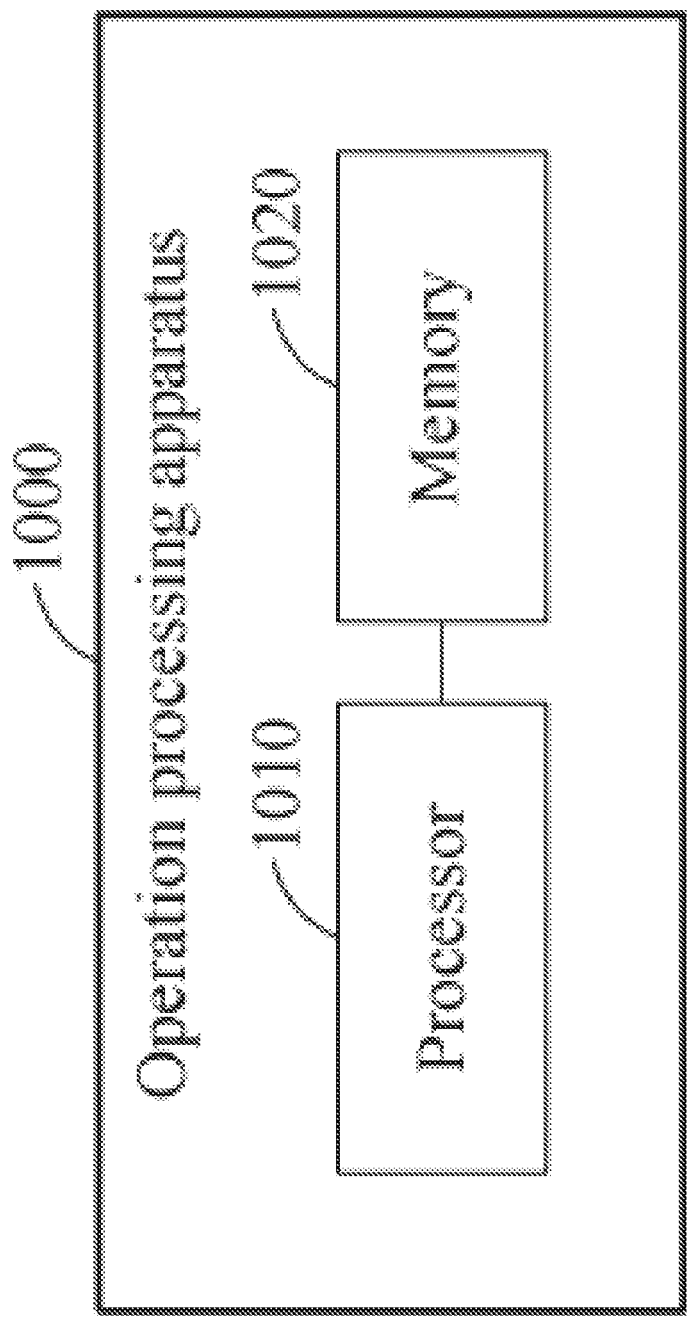
FIG. 11 illustrates an example of a configuration of an operation processing apparatus.

FIG. 11 illustrates an example of a configuration of an operation processing apparatus (for example, an operation processing apparatus 1000). Referring to FIG. 11, the operation processing apparatus 1000 includes a processor 1010 (for example, one or more processors) and a memory 1020 (for example, one or more memories). The memory 1020 may be connected to the processor 1010, and may store instructions executable by the processor 1010, data to be computed by the processor 1010, or data processed by the processor 1010. The memory 1020 may include, for example, a non-transitory computer-readable storage medium, for example, a high-speed random access memory (RAM) and/or a non-volatile computer-readable storage medium (for example, at least one disk storage device, a flash memory device, or other non-volatile solid state memory devices). In an example, the operation processing apparatus 1000 may be the operation processing apparatus 100 of FIG. 1.

The processor 1010 may execute instructions to perform at least one or all of the operations described with reference to FIGS. 1 through 10 above and FIG. 12 below. For example, the processor 1010 may obtain a first weight kernel of a weight model and pruning information of the first weight kernel, may specify a processing range corresponding to each weight element vector of the first weight kernel in an input feature map based on the pruning information, may perform a convolution operation between the input feature map and the first weight kernel based on the specified processing range, and may generate an output feature map based on an operation result of the convolution operation. In addition, the description of FIGS. 1 through 10 and 12 is also applicable to the operation processing apparatus 1000, and further description is not repeated herein.

Figure 12:
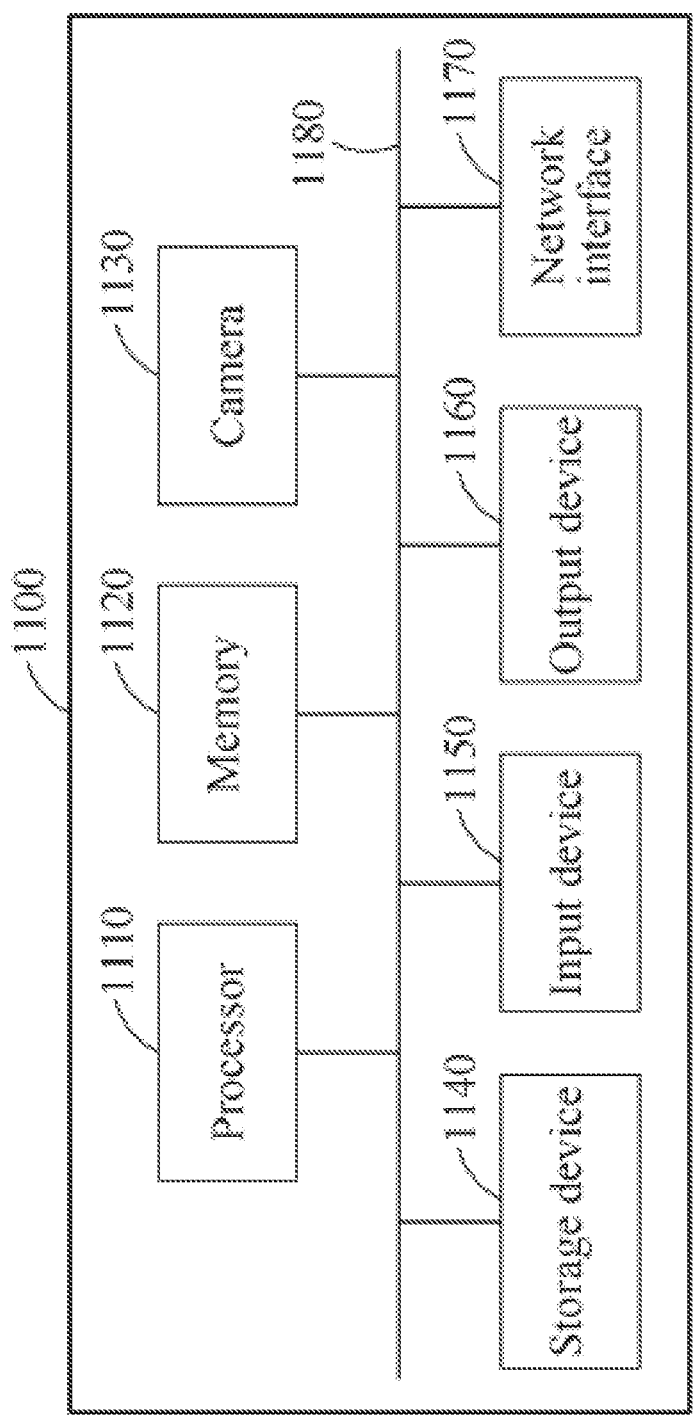
FIG. 12 illustrates an example of an electronic apparatus.

FIG. 12 illustrates an example of an electronic apparatus (for example, an electronic apparatus 1100). The electronic apparatus 1100 may be, or include, the operation processing apparatus 100 of FIG. 1 or the operation processing apparatus 1000 of FIG. 11. The electronic apparatus 1100 may obtain an input image, and may perform operations associated with the input image using a neural network. The operations associated with the input image may include, for example, object classification, object detection, object tracking, object identification, object recognition, or user authentication. For example, the electronic apparatus 1100 may determine an input feature map corresponding to the input image, may generate an output feature map corresponding to the input feature map through at least one layer of the neural network, and may generate any one or any combination of a classification result, a detection result, a tracking result, an identification result, a recognition result, and an authentication result associated with the input image, based on the output feature map.

The electronic apparatus 1100 includes a processor 1110 (e.g., one or more processors), a memory 1120 (e.g., one or more memories), a camera 1130, a storage device 1140, an input device 1150, an output device 1160, and a network interface 1170. The processor 1110, the memory 1120, the camera 1130, the storage device 1140, the input device 1150, the output device 1160, and the network interface 1170 may communicate with each other via a communication bus 1180. For example, the electronic apparatus 1100 may be implemented as at least a portion of, for example, a mobile device such as a mobile phone, a smartphone, a personal digital assistant (PDA), a netbook, a tablet computer or a laptop computer, a wearable device such as a smartwatch, a smart band or smart glasses, a computing device such as a desktop or a server, home appliances such as a television (TV), a smart TV or a refrigerator, a security device such as a door lock, or a vehicle such as a smart vehicle.

The processor 1110 may execute instructions and functions in the electronic apparatus 1100. For example, the processor 1110 may process instructions stored in the memory 1120 or the storage device 1140. The processor 1110 may perform at least one of the operations described above with reference to FIGS. 1 through 12.

The memory 1120 may store data for face detection. The memory 1120 may include a non-transitory computer-readable storage medium or a non-transitory computer-readable storage device. The memory 1120 may store instructions that are to be executed by the processor 1110, and also store information associated with software and/or applications when the software and/or applications are being executed by the electronic apparatus 1100.

The camera 1130 may capture a photo and/or a video and may generate an input image. For example, the camera 1130 may generate a user image including a user (for example, a face). In an example, the camera 1130 may provide a three-dimensional (3D) image including depth information associated with objects.

The storage device 1140 may include a non-transitory computer-readable storage medium or a non-transitory computer-readable storage device. In an example, the storage device 1140 may store a greater amount of information than that of the memory 1120 for a relatively long period of time. For example, the storage device 1140 may include magnetic hard disks, optical disks, flash memories, floppy disks, or other forms of non-volatile memories known in the art.

The input device 1150 may receive an input from a user through a traditional input scheme using a keyboard and a mouse, and through a new input scheme such as a touch input, a voice input and an image input. The input device 1150 may include, for example, a keyboard, a mouse, a touch screen, a microphone, or other devices configured to detect an input from a user and transmit the detected input to the electronic apparatus 1100.

The output device 1160 may provide a user with an output of the electronic apparatus 1100 through a visual channel, an auditory channel, or a tactile channel. The output device 1160 may include, for example, a display, a touchscreen, a speaker, a vibration generator, or any other device configured to provide a user with the output. The network interface 1170 may communicate with an external device via a wired or wireless network.

The operation processing apparatuses, processors, memories, electronic apparatuses, cameras, storage devices, input devices, output devices, network interfaces, communication buses, operation processing apparatus 100, operation processing apparatus 1000, processor 1010, memory 1020, electronic apparatus 1100, processor 1110, memory 1120, camera 1130, storage device 1140, input device 1150, output device 1160, network interface 1170, communication bus 1180, apparatuses, units, modules, devices, and other components described herein with respect to FIGS. 1-12 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented neural network method, the method comprising:
    obtaining a first weight kernel of a weight model and pruning information of the first weight kernel, the pruning information comprises information of a number of valid vectors corresponding to non-zero vectors included in the first weight kernel, information of positions of the valid vectors in the first weight kernel, or combination thereof;
    determining, based on the pruning information, a processing range of an input feature map for each weight element vector of the first weight kernel;
    performing a convolution operation between the input feature map and the first weight kernel based on the determined processing range; and
    generating an output feature map of a neural network layer based on an operation result of the convolution operation.

2. The method of claim 1, wherein
the pruning information comprises information of a number of weight element vectors included in the first weight kernel and information of positions of the weight element vectors in the first weight kernel, and
each of the weight element vectors in the first weight kernel corresponds to a valid vector distinguished from an invalid vector removed from the first weight kernel in a pruning process.

3. The method of claim 1, wherein
the determining of the processing range for each weight element vector comprises determining a first processing range corresponding to a first weight element vector of the first weight kernel in the input feature map based on the pruning information, and
the performing of the convolution operation comprises generating a first intermediate output plane by performing a convolution operation between the first weight element vector and the first processing range.

4. The method of claim 3, wherein the convolution operation between the first weight element vector and the first processing range comprises a 1×1 convolution operation.

5. The method of claim 4, wherein the convolution operation between the first weight element vector and the first processing range comprises 1×1 convolution operations between each input element vector of the first processing range and the first weight element vector.

6. The method of claim 3, wherein the generating of the output feature map comprises generating a first output plane of the output feature map by accumulating intermediate output planes comprising the first intermediate output plane.

7. The method of claim 1, wherein the generating of the output feature map comprises generating a first output plane of the output feature map by accumulating intermediate output planes corresponding to the operation result of the convolution operation.

8. The method of claim 7, wherein the first weight kernel and the first output plane correspond to a first output channel.

9. The method of claim 1, wherein
the weight model comprises a plurality of weight kernels including the first weight kernel, and
weight element vectors of the weight kernels corresponds to non-zero vectors.

10. The method of claim 1, wherein sparsity of each of weight kernels of the weight model is increased through a training process using a respective base weight kernel and scale matrix.

11. The method of claim 10, wherein the training process comprises, for each of the weight kernels:
    inducing a sparsity to the scale matrix based on a loss function; and
    generating the weight kernel based on a pointwise multiplication between the base weight kernel and the sparsity-induced scale matrix.

12. The method of claim 1, further comprising:
    generating an input image using a camera; and
    determining the input feature map, the input feature map corresponding to the input image.

13. A non-transitory computer-readable storage medium storing instructions that, when executed by a processor, configure the processor to perform the method of claim 1.

14. A neural network apparatus, the apparatus comprising:
    a processor configured to:
        obtain a first weight kernel of a weight model and pruning information of the first weight kernel, the pruning information comprises information of a number of valid vectors corresponding to non-zero vectors included in the first weight kernel, information of positions of the valid vectors in the first weight kernel, or combination thereof;
        determine, based on the pruning information, a processing range of an input feature map for each weight element vector of the first weight kernel;
        perform a convolution operation between the input feature map and the first weight kernel based on the determined processing range; and
        generate an output feature map of a neural network layer based on an operation result of the convolution operation.

15. The apparatus of claim 14, wherein
the pruning information comprises information of a number of weight element vectors included in the first weight kernel and information of positions of the weight element vectors in the first weight kernel, and
each of the weight element vectors in the first weight kernel corresponds to a valid vector distinguished from an invalid vector removed from the first weight kernel in a pruning process.

16. The apparatus of claim 14, wherein the processor is configured to:
    for the determining of the processing range for each weight element vector, determine a first processing range corresponding to a first weight element vector of the first weight kernel in the input feature map based on the pruning information; and
    for the performing of the convolution operation, generate a first intermediate output plane by performing a convolution operation between the first weight element vector and the first processing range.

17. The apparatus of claim 16, wherein, for the generating of the output feature map, the processor is configured to generate a first output plane of the output feature map by accumulating intermediate output planes comprising the first intermediate output plane.

18. The apparatus of claim 14, wherein, for the generating of the output feature map, the processor is configured to generate a first output plane of the output feature map by accumulating intermediate output planes corresponding to the operation result of the convolution operation.

19. The apparatus of claim 14, wherein
the weight model comprises a plurality of weight kernels including the first weight kernel, and
weight element vectors of the weight kernels correspond to non-zero vectors.

20. The apparatus of claim 14, wherein sparsity of each of weight kernels of the weight model is increased through a training process using a respective base weight kernel and scale matrix.

21. The data processing apparatus of claim 14, wherein
the apparatus is an electronic apparatus comprising a camera configured to generate an input image, and
the processor is configured to determine the input feature map, the input feature map corresponding to the input image.

22. The apparatus of claim 14, further comprising a memory storing instructions that, when executed by the processor, configure the processor to perform the obtaining of the first weight kernel, the determining of the processing range, the performing of the convolution, and the generating of the output feature map.

23. An electronic apparatus comprising:
a camera configured to generate an input image; and
a processor configured to:
  determine an input feature map corresponding to the input image;
  obtain a first weight kernel of a weight model and pruning information of the first weight kernel, the pruning information comprises information of a number of valid vectors corresponding to non-zero vectors included in the first weight kernel, information of positions of the valid vectors in the first weight kernel, or combination thereof;
  determine, based on the pruning information, a processing range of the input feature map for each weight element vector of the first weight kernel;
  perform a convolution operation between the input feature map and the first weight kernel based on the determined processing range; and
  generate an output feature map of a neural network layer based on an operation result of the convolution operation.

24. The electronic apparatus of claim 23, wherein the processor is configured to:
  for the determining of the processing range for each weight element vector, determine a first processing range corresponding to a first weight element vector of the first weight kernel in the input feature map based on the pruning information; and
  for the performing of the convolution operation, generate a first intermediate output plane by performing a convolution operation between the first weight element vector and the first processing range.

25. The electronic apparatus of claim 23, wherein the processor is configured to generate a recognition result for the input image based on the output feature map.

26. A processor-implemented neural network method, the method comprising:
  determining, for each valid vector of valid vectors of a pruned weight kernel, a processing range of an input feature map based on a position of the valid vector within the pruned weight kernel;
  performing, for each valid vector, a convolution operation between the valid vector and the corresponding processing range of the input feature map; and
  generating a channel of an output feature map of a neural network layer by accumulating results of the convolution operation performed for each valid vector.

27. The method of claim 26, wherein a position of each processing range within the input feature map corresponds to the position of the corresponding valid vector within the pruned weight kernel.

28. The method of claim 26, wherein the valid vectors correspond to non-zero vectors of the pruned weight kernel.

29. A processor-implemented neural network method, the method comprising:
  obtaining valid vectors of pruned weight kernels and pruning information of the valid vectors, the pruning information comprises information of a number of valid vectors corresponding to non-zero vectors included in the first weight kernel, information of positions of the valid vectors in the first weight kernel, or combination thereof;
  determining, for each valid vector, a processing range of an input feature map based on the pruning information;
  generating, for each valid vector, an intermediate output plane by performing a convolution operation between the valid vector and the corresponding processing range; and
generating an output feature map by generating, for each weight kernel, an output plane of an output feature map by accumulating the intermediate output planes corresponding to the weight kernel.

* * * * *